United States Patent Office 3,761,255

Patented Sept. 25, 1973

3,761,255

MAGNETIC ALLOY HAVING HIGH MAGNETIC PERMEABILITY AND HIGH HARDNESS

Takeshi Miyazaki, Omiya, and Yoichi Ishijima and Yoshizo Sawada, Kumagaya, Japan, assignors to Hitachi Metals, Inc., Tokyo, Japan No Drawing. Filed June 29, 1971, Ser. No. 158,056
Claims priority, application Japan, July 1, 1970, 45/56,917
Int. Cl. C22c *19/00*
U.S. Cl. 75—170 6 Claims

ABSTRACT OF THE DISCLOSURE

A magnetic alloy having high magnetic permeability and high hardness containing 2 to 6 weight percent of Mo, 0.5 to 5 weight percent of Ti, 0.5 to 5 weight percent of Nb, 70 to 83 weight percent of Ni, less than 2 weight percent of Mn, and balance Fe and impurities.

The present invention relates to a magnetic alloy having high magnetic permeability and hardness which may be used in a magnetic recording head or the like requiring high wear resistance.

A conventional magnetic recording head has mainly been made of material called Mo-permalloy or $\mu$ metal. However, such a magnetic head has disadvantages in that prolonged use leads to wear of the head due to frictional engagement with the magnetic tape, with a result that the recording characteristics deteriorate badly. Therefore, for magnetic tape recorder and reproduction means for an electronic computer in which high reliability is required, a high wear resistant material is requred to make the magnetic heads.

Known magnetic alloys for magnetic heads include hard material such as 16Al-Fe alloy, as well as the aforementioned permalloy type alloy (Fe-Ni alloy). However, since the former is low in magnetic permeability and has poor workability, it has been used only in apparatus in which the magnetic head is placed in a high speed sliding motion mode. The permalloy type alloy has an excellent magnetic permeability but has an insufficient hardness, while the 16Al-Fe alloy has an excellent hardness but has low magnetic permeability.

The present invention has an object to eliminate the aforementioned disadvantages of known alloys and provide Fe-Ni alloy having high permeability and hardness.

According to the present invention, Ti and Nb are further added to said Mo-permalloy alloy so that the elements co-operate to substantially increase the hardness without depreciating the magnetic characteristics.

According to the present invention, the alloy contains 2 to 6 weight percent of Mo, 0.5 to 5 weight percent of Ti, 0.5 to 5% of Nb, 70 to 83 percent weight percent of Ni, and less than 2 weight percent of Mn, the balance being Fe and impurities. According to a preferred aspect of the present invention, the alloy contains 3.5 to 4 weight percent of Mo, 2 to 3 weight percent of Ti, 2.5 to 3 weight percent of Nb, 78 to 80 weight percent of Ni, and 0.3 to 0.7 weight percent of Mn, the balance being Fe and impurities.

Mo is highly effective in improving the magnetic characteristics although it is not effective in increasng the hardness. Mo does not have a noticeable effect when it is less than 2 weight percent while it decreases the magnetic flux density to a value insufficient for practical use when it exceeds 6 weight percent. Ti is very effective in increasing the hardness, but it does not have a big effect when it is less than 0.5 weight percent. When Ti exceeds 5 weight percent, it decreases the magnetic flux density and makes it difficult to manufacture a thin sheet from the alloy. Nb is effective in improving the magnetic characteristics and co-operates with Ti so as to greatly increase the hardness. When the Nb content is less than 0.5 weight percent, it is not so effective and, when it exceeds 5 weight percent, it decreases the saturated magnetic flux density. Ni provides the best magnetic characteristics around 80 weight percent but is effective between 70 to 83 weight percent. When Ni content exceeds 83 weight percent, there is insufficient magnetic flux density, and when it is less than 70 weight percent, the permeability is decreased. Mn contained is less than 2 weight percent. Small amounts of impurities usually contained in raw material, such as CO contained in Ni, Ta in Nb, and C, Si, Al and Mn in Fe may exist providing they do not exceed usually permitted amounts. Further, such elements that are usually used as deoxidizers, for example, Si, Al and Mg may be contained providing the total amount does not exceed 2 weight percent.

The following is an example of the present invention. Materials have been mixed in accordance with the composition of the present invention and 10 kg. of the mixture was melted in a vacuum furnace. Thereafter, the molten metal was cast into a slab ingot of 50 mm. wide and 10 mm. thick. The ingot was then rolled at a temperature of 1100° C. until the thickness was reduced to 6 mm. Then the ingot was further rolled to form a sheet 0.2 mm. thick. The sheet was thereafter heated to 1100° C. for three hours and cooled in the furnace. The heat treatment was performed in an atmosphere of hydrogen having dew point of —40° C. Cooling from 600° C. was performed either by furnace cooling or by quenching. The magnetic characteristics of the alloys are shown in the table.

TABLE

| Composition (percent wt.) | Initial magnetic permeability (g./oe.) | Coercive force (oe.) | Magnetic flux density (kg. at 10 oe.) | Hardness (Hv) |
|---|---|---|---|---|
| Alloy of the present invention: | | | | |
| 79Ni-5Mo-0.5Ti-3Nb-Fe | 25,000 | 0.027 | 6.2 | 160 |
| 80Ni-2Mo-3Ti-3Nb-Fe | 24,000 | 0.020 | 6.2 | 290 |
| 80Ni-4Mo-3Ti-3Nb-Fe | 42,000 | 0.012 | 5.0 | 240 |
| 80Ni-2Mo-3Ti-0.5Nb-Fe | 18,000 | 0.024 | 7.6 | 210 |
| 79Ni-5Mo-4Ti-1Nb-Fe | 15,000 | 0.025 | 5.0 | 240 |
| Prior Art alloy: | | | | |
| 79Ni-4Mo-Fe | 30,000 | 0.015 | 8.7 | 110 |
| 77Ni-4Mo-5Cu-Fe | 45,000 | 0.012 | 7.0 | 110 |
| 16Al-Fe | 6,000 | 0.03 | 7.8 | 250 |

The 79Ni-4Mo-2.5Ti-4Nb-Fe alloy had more than 40,000 of initial magnetic permeability, less than 0.015 oe. of coercive force, more than 4800 g. of magnetic flux density at the magnetic field of 10 oe., more than 210 of Vickers hardness, and 105 $\mu\Omega$-cm. of electric resistance. From these examples it will be clear that the alloy in accordance with the present invention has a greater hardness than known 79Ni-4Mo-Fe series or 97Ni-4Mo-5Cu-Fe series alloys. Further, the alloy of the present invention has an initial magnetic permeability much higher than that of 16Al-Fe alloy and substantially equal to those of widely used Mo-permalloy $\mu$-metal series alloys. The alloy of the present invention has further advantage in that it is easily formed into a thin sheet less than 0.1 mm. thick and has a large specific resistance. Furthermore, as this material is harder than Mo permalloy, and $\mu$-metal series alloy, so these invented materials can be handled roughly. Thus, the alloy can be used in manufacturing improved magnetic recording heads or in other uses.

What is claimed is:

1. A magnetic alloy having high magnetic permeability and hardness consisting essentially of 2 to 6 weight percent of Mo, 0.5 to 5 weight percent of Ti, 0.5 to 5 weight percent of Nb, 70 to 83 weight percent of Ni, and less than 2 weight percent of Mn, the balance being Fe.

2. Magnetic alloy having high magnetic permeability and hardness consisting essentially of 3.5 to 4 weight percent of Mo, 2 to 3 weight percent of Ti, 2.5 to 3 weight percent of Nb, 78 to 80 weight percent of Ni, and 0.3 to 0.7 weight percent of Mn, the balance being Fe.

3. The magnetic alloy according to claim 1 consisting essentially of 5 weight percent of Mo, 0.5 weight percent of Ti, 3 weight percent of Nb, 79 weight percent of Ni, the balance being Fe.

4. The magnetic alloy according to claim 1 consisting essentially of 2 weight percent of Mo, 3 weight percent of Ti, 3 weight percent of Nb, 80 weight percent of Ni, the balance being Fe.

5. The magnetic alloy according to claim 1 consisting essentially of 2 weight percent of Mo, 3 weight percent of Ti, 0.5 weight percent of Nb, 80 weight percent of Ni, the balance being Fe.

6. The magnetic alloy according to claim 1 consisting essentially of 5 weight percent of Mo, 4 weight percent of Ti, 1 weight percent of Nb, 79 weight percent of Ni, the balance being Fe.

References Cited

UNITED STATES PATENTS

| | | | |
|---|---|---|---|
| 3,420,660 | 1/1969 | Kavahatta | 75—171 |
| 2,899,302 | 8/1959 | Cape | 75—170 |
| 2,783,170 | 2/1957 | Littman | 75—170 |
| 3,186,707 | 6/1965 | Banning | 75—170 |

HYLAND BIZOT, Primary Examiner

UNITED STATES PATENT OFFICE

CERTIFICATE OF CORRECTION

Patent No. 3,761,255 Dated September 25, 1973

Inventor(s) Takeshi Miyazaki, Yoichi Ishijima and Yoshizo Sawada

It is certified that error appears in the above-identified patent and that said Letters Patent are hereby corrected as shown below:

Column 1, line 6, which now reads:

"Metals, Inc., Tokyo, Japan"

Should read:

-- Metals, Ltd., Tokyo, Japan --

Signed and sealed this 9th day of July 1974.

(SEAL)
Attest:

McCOY M. GIBSON, JR.
Attesting Officer

C. MARSHALL DANN
Commissioner of Patents